(12) United States Patent
Rock et al.

(10) Patent No.: US 9,755,251 B2
(45) Date of Patent: Sep. 5, 2017

(54) ELECTRICAL SIGNAL PROCESSING SYSTEM FOR FUEL CELL STACK

(71) Applicant: GM GLOBAL TECHNOLOGY OPERATIONS LLC, Detroit, MI (US)

(72) Inventors: Jeffrey A. Rock, Rochester Hills, MI (US); Jeff D. Williams, Tonawanda, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 92 days.

(21) Appl. No.: 14/729,481

(22) Filed: Jun. 3, 2015

(65) Prior Publication Data

US 2015/0263359 A1   Sep. 17, 2015

Related U.S. Application Data

(62) Division of application No. 12/421,329, filed on Apr. 9, 2009, now Pat. No. 9,088,021.

(51) Int. Cl.
*H01M 8/0202* (2016.01)
*H01M 8/04537* (2016.01)

(52) U.S. Cl.
CPC ....... *H01M 8/0269* (2013.01); *H01M 8/0202* (2013.01); *H01M 8/04537* (2013.01); *Y02E 60/50* (2013.01)

(58) Field of Classification Search
CPC ............. H01M 8/0202; H01M 8/0269; H01M 8/04537
See application file for complete search history.

(56) References Cited

U.S. PATENT DOCUMENTS

| | | | |
|---|---|---|---|
| 6,410,176 B1 * | 6/2002 | Genc | H01M 4/42 429/127 |
| 6,692,264 B2 * | 2/2004 | Fuss | H01M 8/04552 439/66 |

* cited by examiner

*Primary Examiner* — Barbara Gilliam
*Assistant Examiner* — Angela Martin
(74) *Attorney, Agent, or Firm* — John A. Miller; Miller IP Group, PLC

(57) ABSTRACT

A system and method for processing the electric signals from a plurality of fuel cells in a fuel cell system is disclosed. Groups of the plurality of fuel cells, such as five bipolar plates, are electrically coupled to a conductive compressible connector or a circuit board, where some of the bipolar plates have a plate contactor for providing the electrical contact to either the conductive compressible connector or the circuit board. The system allows for the processing of the electric signals of every cell using fewer electrical components, thereby reducing the amount of space required and the costs associated therewith.

13 Claims, 10 Drawing Sheets

ELECTRICAL SIGNAL PROCESSING SYSTEM FOR FUEL CELL STACK

CROSS-REFERENCE TO RELATED APPLICATIONS

This application is a Divisional application of U.S. patent application Ser. No. 12/421,329, filed Apr. 9, 2009, titled "Multi-Cell Electric Signal Processing Bipolar Plate Features".

BACKGROUND OF THE INVENTION

Field of the Invention

This invention relates generally to a system and method for processing the electric signals from a plurality of fuel cells utilizing one circuit board and, more particularly, to a system and method for processing the electric signals from a plurality of fuel cells utilizing one circuit board connected to a conductive compressible connector or connected directly to bipolar plates by plate contactors.

Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode side catalyst to generate free protons and electrons. The protons pass through the electrolyte to the cathode. The protons react with the oxygen and the electrons in the cathode side catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode electrodes (catalyst layers) typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). Each MEA is usually sandwiched between two sheets of porous material, a gas diffusion layer (GDL), that protects the mechanical integrity of the membrane and helps in uniform reactant and humidity distribution. The part of the MEA that separates the anode and cathode flows is called the active area, and only in this area the water vapors can be freely exchanged between the anode and cathode. MEAs are relatively expensive to manufacture and require certain humidification conditions for effective operation.

Fuel cells are typically comprised of a plurality of electrically conductive unipolar and bipolar plates alternatively assembled (stacked) with a plurality of MEAs, electrodes, gaskets, seals and gas diffusion media (also known as "softgoods"). Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a reaction by-product. The fuel cell stack also receives an anode hydrogen reactant gas that flows into the anode side of the stack. The stack also includes flow channels through which a cooling fluid flows.

A fuel cell stack includes a series of bipolar plates (separators) positioned between the several MEAs in the stack, where the bipolar plates and the MEAs are positioned between the two end plates. The bipolar plates include anode side and cathode side flow distributors (flow fields) for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. After stacking, these components are typically placed under compression to minimize electrical contact resistances and to close the seals. The end plates conduct the electricity generated by the fuel cells out of the stack. The bipolar plates also include flow channels through which a cooling fluid flows.

It is known in the art to process the electric signals from certain plates in a fuel cell system to determine whether the fuel cell stack is functioning properly and to perform cell-to-cell short-circuiting, as is known to those having skill in the art. Typically, electric signal processing is done every other cell because of the costs associated with monitoring every cell. Furthermore, it can be difficult to provide the necessary components in the space available to process the electric signal from every cell. There is a need in the art for processing the electric signal from every cell while minimizing the cost and space requirements associated therewith.

SUMMARY OF THE INVENTION

In accordance with the teachings of the present invention, a system and method for processing the electric signals from a plurality of fuel cells in a fuel cell system is disclosed. Groups of the plurality of fuel cells, such as five bipolar plates, are electrically coupled to a compressible connector or a circuit board, where some of the bipolar plates have a plate contactor for providing the electrical contact to either the compressible connector or the circuit board. The system allows for the processing of the electric signals of every cell using fewer electrical components, thereby reducing the amount of space required and the costs associated therewith.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for electric signal processing of a plurality of fuel cells of a fuel cell system is merely exemplary in nature, and is in no way intended to limit the invention or its applications or uses.

Figure 1:
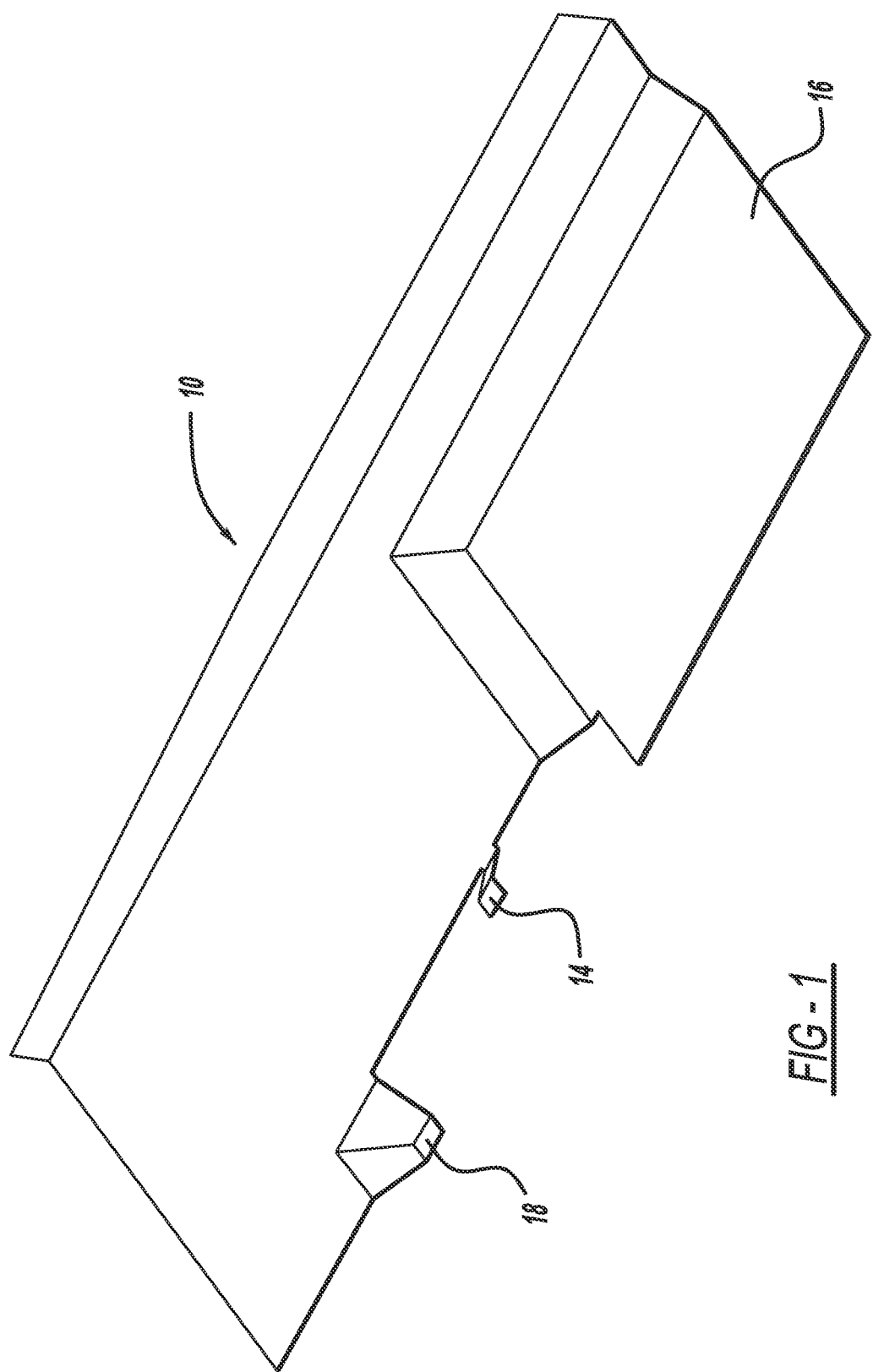
FIG. 1 is a diagram of a bipolar plate for a fuel cell stack with a plate contactor.

A first embodiment of the present invention is shown in FIGS. 1-6, where FIG. 1 is a diagram of a bipolar plate 10. As is known to those skilled in the art, two bipolar plates with a membrane electrode assembly (MEA) and other soft goods, such as sub-gaskets and a gas diffusion layer (GDL), make up a fuel cell, and typically several fuel cells are connected in series to make up a fuel cell stack. The bipolar plate 10 has a metal plate contactor 14 which is stamped and shaped to serve as a point of electrical conductance, as will be discussed in detail below. The bipolar plate 10 also has a circuit board depression 16 where a circuit board will be positioned, and a connector depression 18 where the corner of a conductive compressible connector will be positioned, as will be discussed in detail below.

Figure 2:
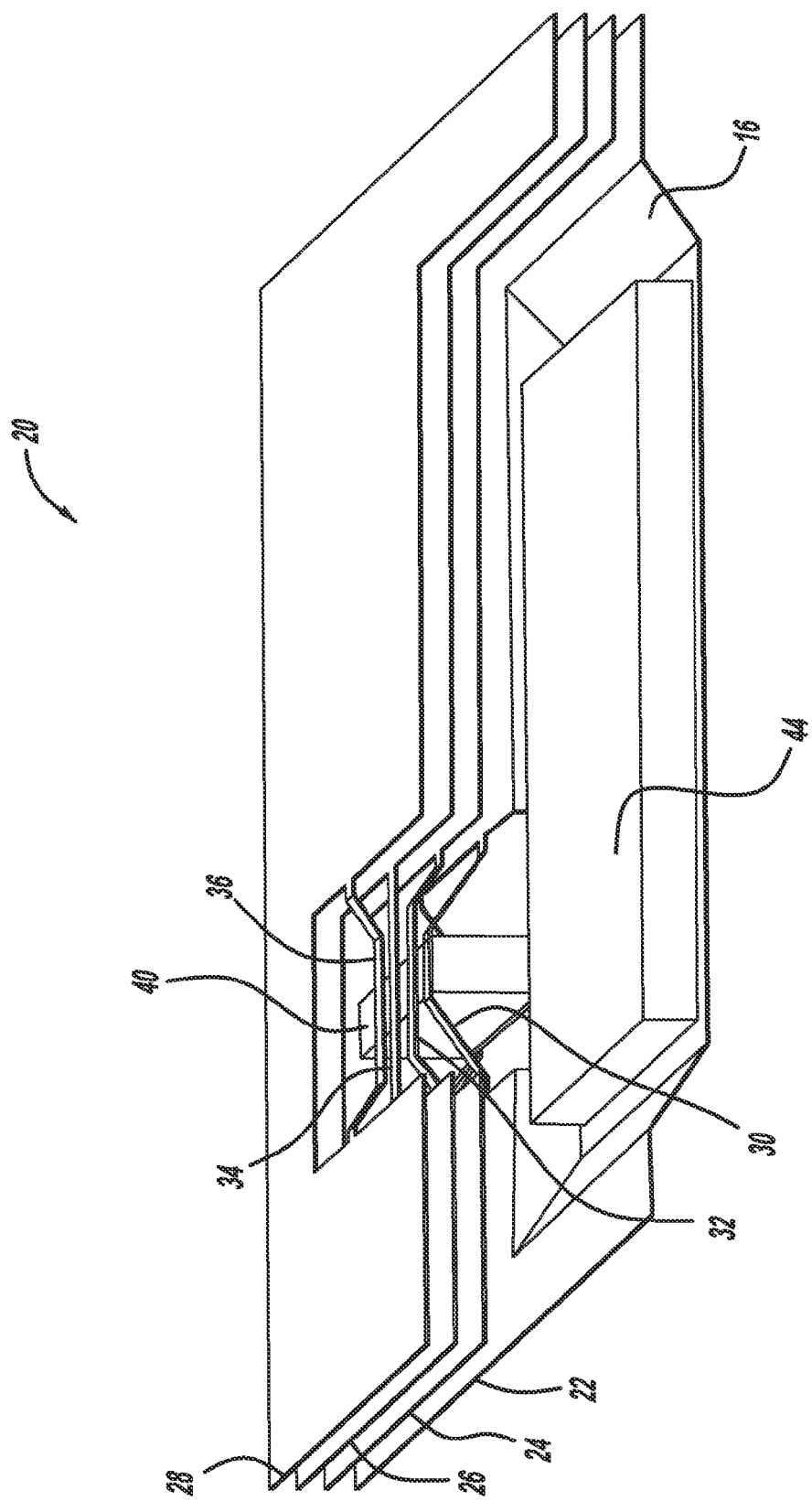
FIG. 2 is a diagram of a series of bipolar plates for a fuel cell stack with plate contactors touching a conductive compressible connector, and with the conductive compressible connector connected to a circuit board using a trace connector.

FIG. 2 is a diagram 20 of four stacked bipolar plates 22, 24, 26 and 28. While four stacked bipolar plates are used in this non-limiting embodiment, a different number of bipolar plates could be used, as will be described below. Each of the stacked bipolar plates 22, 24, 26 and 28 includes a plate contactor 30, 32, 34, and 36, respectively. Each of the plate contactors 30, 32, 34 and 36 are specifically designed to be positioned on the top of and be in electrical contact with a conductive compressible connector 40. An example of one suitable conductive compressible connector that may be used, but is not limited to, is an elastomeric connector. As is known by those skilled in the art, an elastomeric connector is comprised of a non-conductive elastomer, such as rubber, with strategically placed conductive portions of a different substance, such as copper wires. Elastomeric connectors may also be laminates of alternating conductive and non-conductive elastomers. Conductive compressible connectors are sold under a variety of trade names and are available in a variety of configurations, as is known to those skilled in the art.

The conductive compressible connector 40 is connected to a circuit board 44. Thus, the bipolar plates 22, 24, 26 and 28 are monitored through the plate contactors 30, 32, 34 and 36 utilizing the same conductive compressible connector 40 and the same circuit board 44. This in turn means that each circuit board 44 is attached to the electrical components and communication devices required to process the electric signal of the four fuel cells. Accordingly, the number of electrical components and communication devices required to monitor and operate the fuel cell stack is reduced, thereby reducing the cost and amount of space needed to effectively operate the fuel cell stack.

Figure 3:
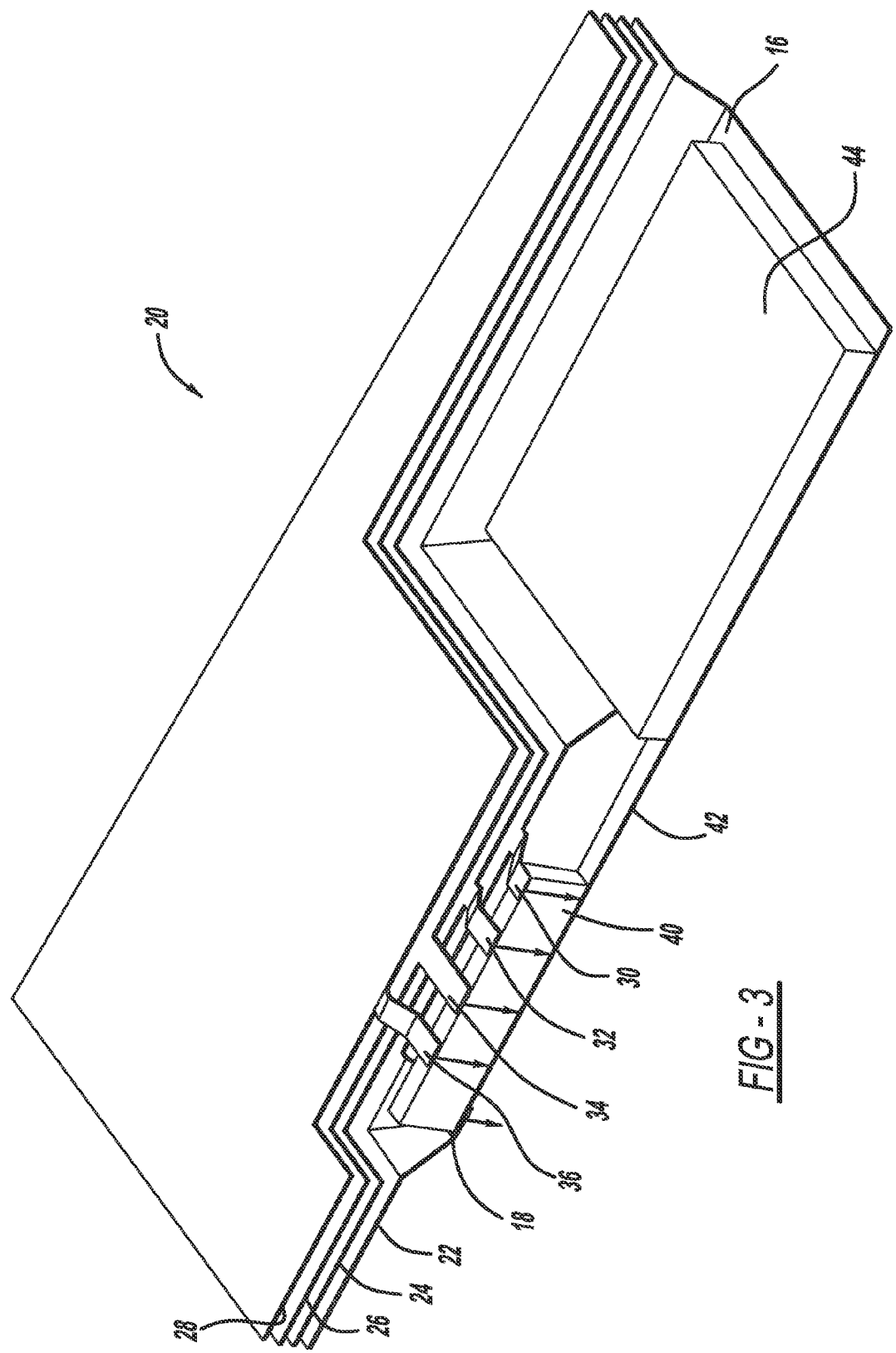
FIG. 3 is a diagram of an alternate view of bipolar plates with plate contactors touching a conductive compressible connector which is seated on and electrically coupled to a trace connector which is connected to a circuit board.

FIG. 3 is another view of the diagram 20 illustrating the bipolar plates 22, 24, 26 and 28 from a different perspective. The bipolar plates 22, 24, 26 and 28 each have a plate contactor 30, 32, 34 and 36, respectively. Each plate contactor 30, 32, 34 and 36 is stamped and shaped to make electrical contact with the conductive compressible connector 40 at the desired location on the conductive compressible connector 40. The arrows pointing downward through the conductive compressible connector 40 illustrate the conduction path from the plate contactors 30, 32, 34 and 36, respectively. The arrow pointing down from connector depression 18 illustrates the conduction path for bipolar plate 22 if a conductive compressible connector below is present, which is discussed in more detail below. In this way, the conductive compressible connector 40 allows each bipolar plate 22, 24, 26 and 28 to be monitored individually by the same circuit board 44.

The conductive compressible connector 40 is seated in the connector depression 18. The connector depression 18 provides an area to insert a corner of the conductive compressible connector 40, and is also capable of being electrically connected to a conductive compressible connector (not shown) seated directly below the connector depression 18 (if any) in the fuel cell stack, which will be discussed in more detail below. A trace connector 42 is provided between and electrically coupled to the conductive compressible connector 40 and the circuit board 44 to provide the electrical connection therebetween. The trace connector 42 may be rigid extension of the circuit board 44 or a flexible circuit substrate, as is known to those skilled in the art. The conductive compressible connector 40 sits on top of and is in electrical communication with the trace connector 42. The circuit board 44 is seated in the circuit board depression 16. The trace connector 42 allows the conductive compressible connector 40 and the circuit board 44 to be electrically coupled without requiring a rigid connection or physical contact between the conductive compressible connector 40 and the circuit board 44, thereby allowing greater dimensional variation in the components in a fuel cell stack.

Figure 4:
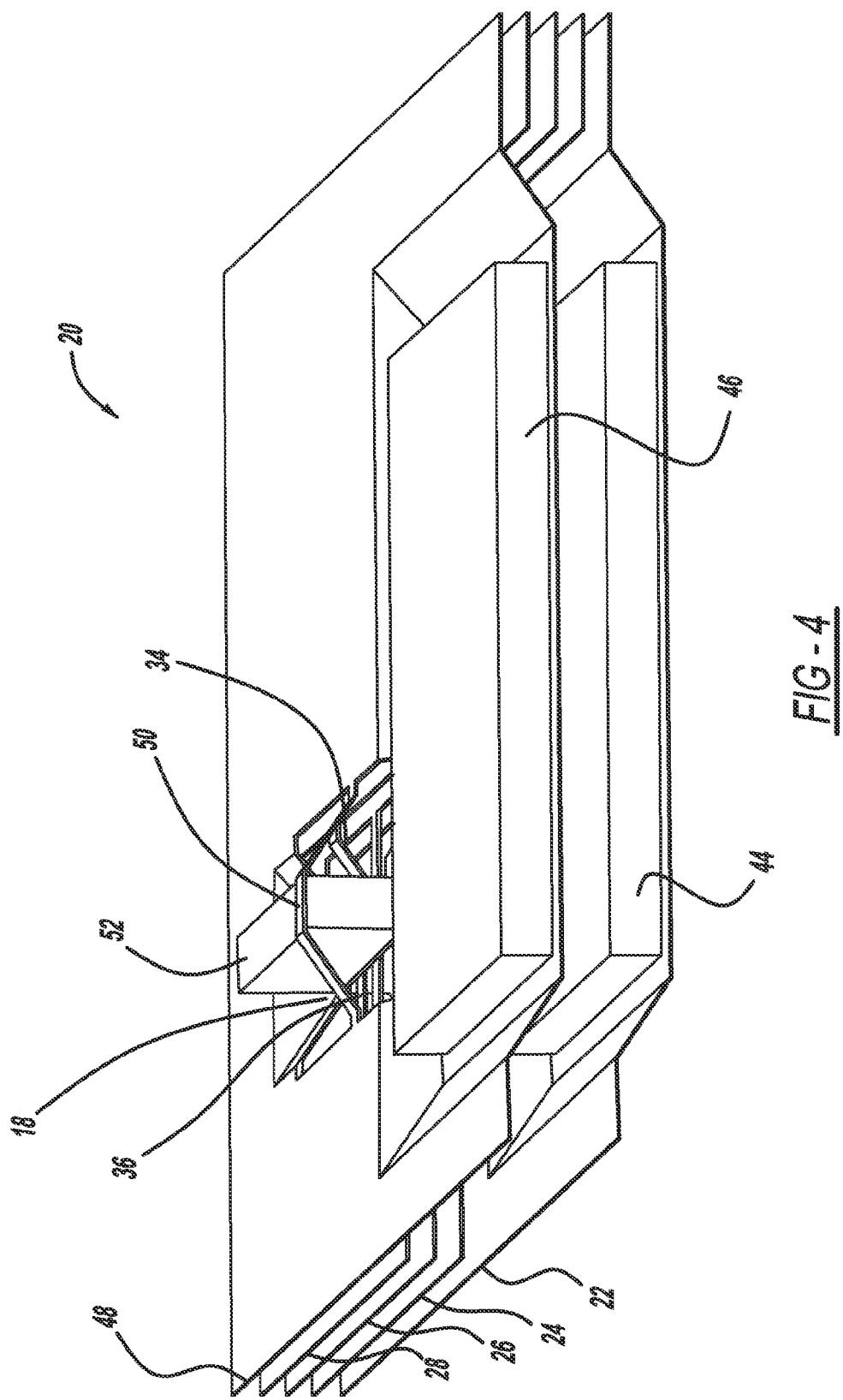
FIG. 4 is a diagram emphasizing the last plate, which is required to contact two conductive compressible connectors, each of which are connected to separate circuit boards.

FIG. 4 illustrates how each set of four fuel cells or more of the diagram 20 is stacked with other sets of fuel cells. The bipolar plates 22, 24, 26 and 28 are shown, and the bipolar plate contactors 34 and 36 can be seen, as well as the circuit board 44. A fifth bipolar plate 48 is shown, and a second conductive compressible connector 52 is also shown seated in the connector depression 18. Although not shown, a trace connector is below the conductive compressible connector 52 and is also seated in the connector depression 18. Thus, the second conductive compressible connector 52 does not directly touch the connector depression 18 of the fifth bipolar plate 48.

The conductive compressible connector 40 is in electrical contact with the bipolar plate 48 through a bipolar plate contactor 50 on the bipolar plate 48. Below the second conductive compressible connector 52 and the bipolar plate contactors 34 and 36 sits the conductive compressible connector 40, although it is not shown. The bottom side of the contactor depression 18 of the bipolar plate 48 is in electrical communication with the conductive compressible connector 40 below the conductive compressible connector 52, and the bipolar plate contactor 50 of the bipolar plate 48 is in electrical communication with the conductive compressible connector 52. Thus, the electric signal of the bipolar plate 48 is known by the circuit board 44 through the bottom side of the connector depression 18, and the electric signal of the bipolar plate 48 is also known by the circuit board 46 through the plate contactor 50. This is necessary because each plate is a bipolar plate having an anode side and a cathode side, therefore, to measure the electric signal of four fuel cells the electric signal of five bipolar plates must be known, as is readily apparent to those skilled in the art.

Figure 5:
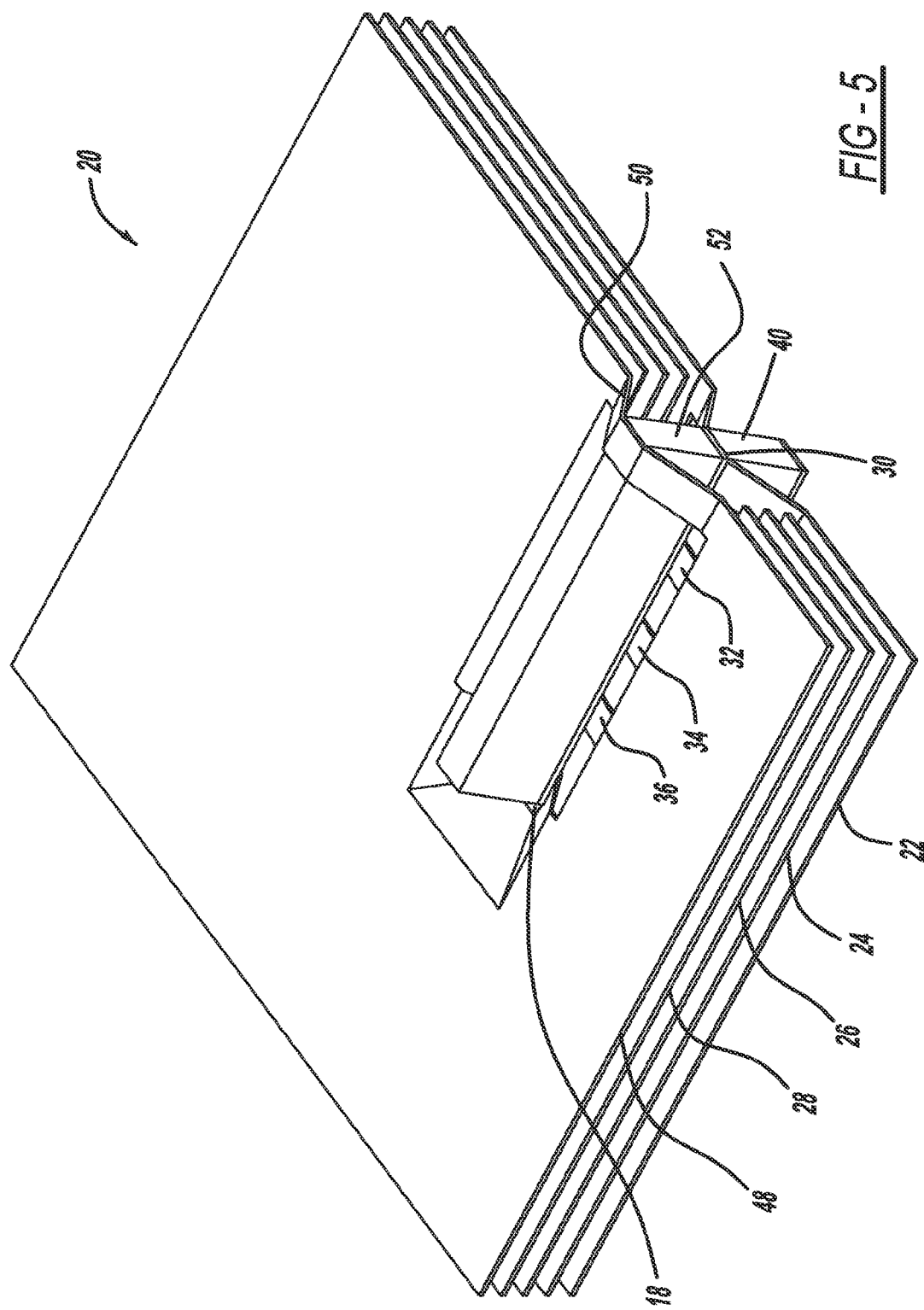
FIG. 5 is a cut-away view of FIG. 4 illustrating four fuel cells and a conductive compressible connector as an example of an electronic signal package.

FIG. 5 is a cut-away view of FIG. 4 showing the diagram 20 with the five bipolar plates 22, 24, 26, 28 and 48 and the two conductive compressible connectors 40 and 52. The plate contactors 30, 32, 34 and 36 and the bottom of the connector depression 18 of the bipolar plate 48 are in electrical communication with the conductive compressible connector 40. The plate contactor 50 of the bipolar plate 48 is in electrical communication with the conductive compressible connector 52. Although not shown, the circuit boards 44 and 46 are in electrical communication with the conductive compressible connectors 40 and 52, respectively. Each circuit board is further in electrical communication with electrical components (not shown). The electrical components may include, but are not limited to, a power conversion module, a power distribution module, and communication devices such as a transmitter and a receiver.

Figure 6:
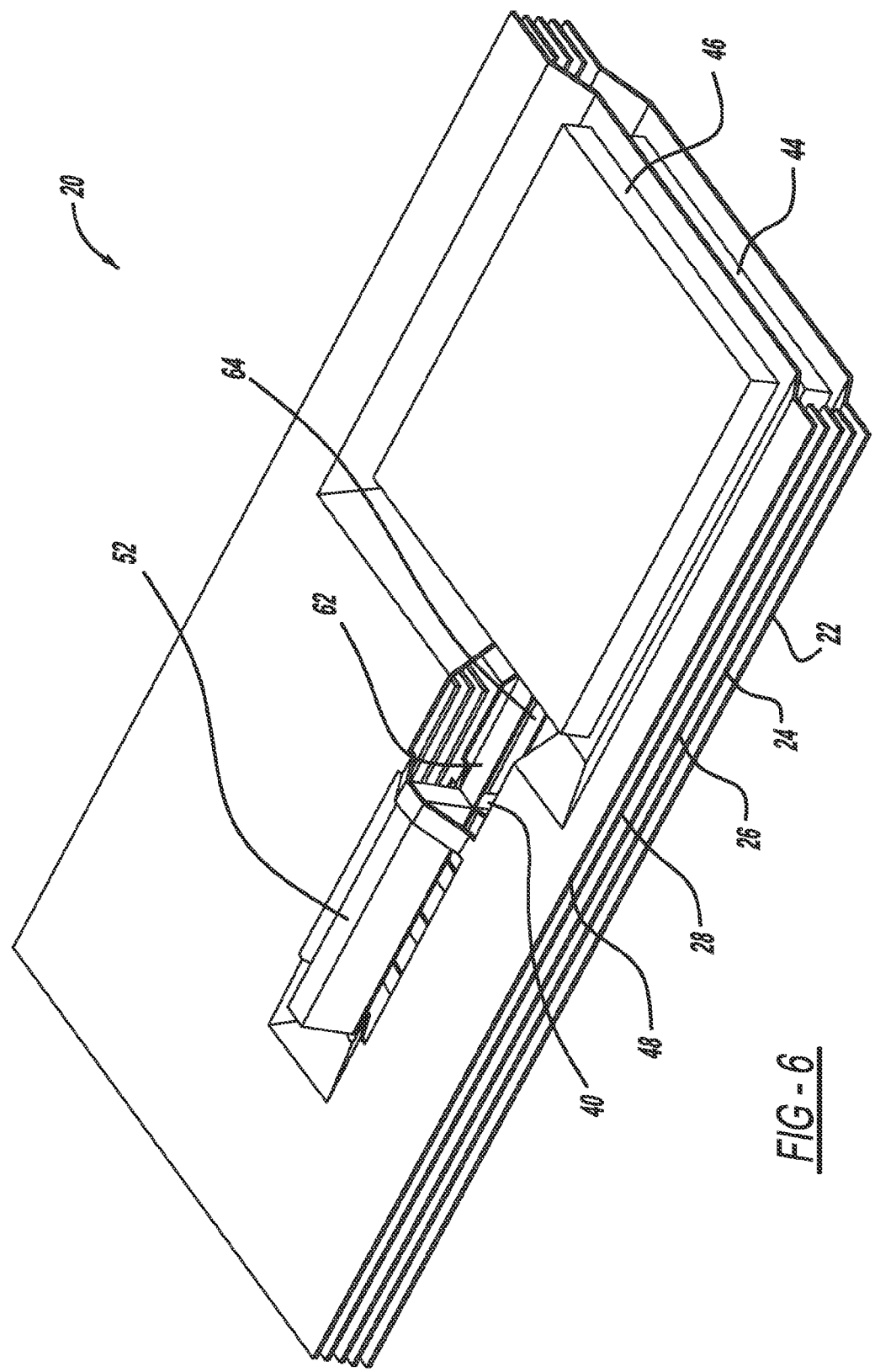
FIG. 6 is a diagram of a trace connector which connects the conductive compressible connector to the circuit board.

FIG. 6 is another view of diagram 20 showing the five bipolar plates 22, 24, 26, 28 and 48, the two conductive compressible connectors 40 and 52, and the circuit boards 44 and 46. Furthermore, a trace connector 62 connects the conductive compressible connector 52 to the circuit board 46, and a trace connector 64 connects the conductive compressible connector 40 to the circuit board 44. Trace connectors 62 and 64 allow for the circuit boards 44 and 46 to be spaced away from the conductive compressible connectors 40 and 52, as desired. These components allow for a plurality of fuel cells of the fuel cell stack to be electrically coupled to a single conductive compressible connector and a single circuit board, and allow for sets of the plurality of fuel cells to be stacked in series to make the fuel cell stack. Each of the plurality of fuel cells are connected to the electrical components necessary for signal processing, thus allowing for the electric signal of each of the fuel cells to be processed by sharing the electrical components necessary for signal processing among the plurality of fuel cells. Furthermore, cell-to-cell short-circuiting may be implemented as desired. Thus, the costs associated with the operation of the fuel cell stack are reduced, as is the amount of space required without compromising electric signal processing of the fuel cells in the stack.

Figure 7:
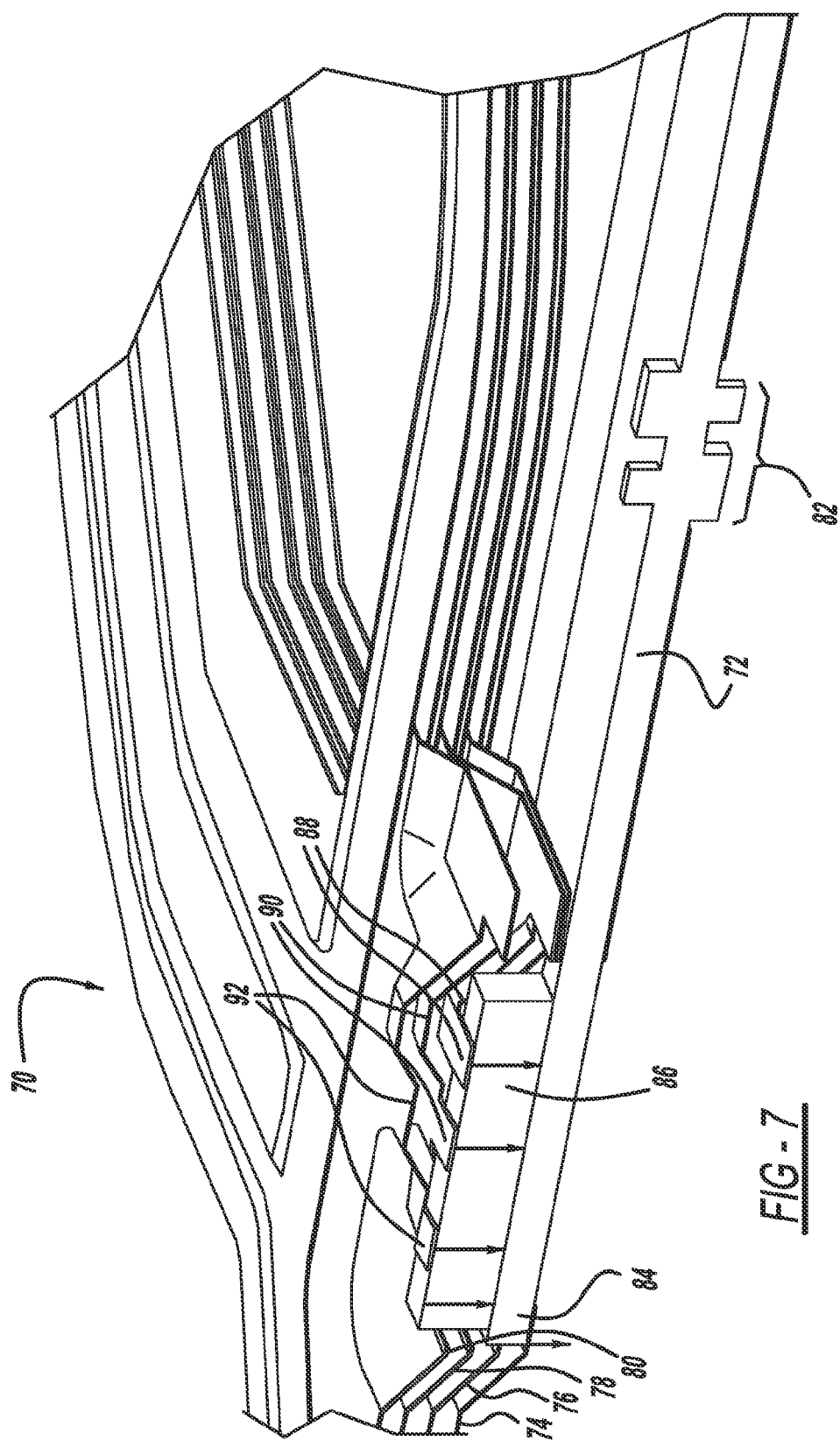
FIG. 7 is a diagram of four bipolar plates connected to a conductive compressible connector, where the conductive compressible connector is seated on and electrically coupled to a circuit board.
Figure 8:
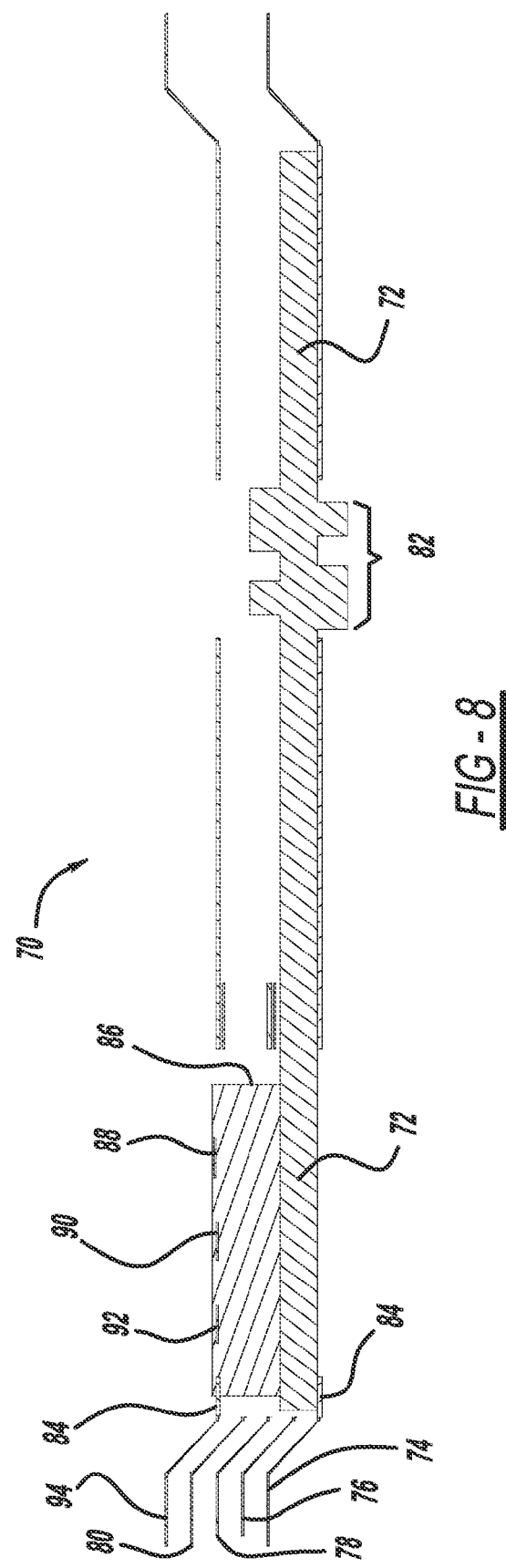
FIG. 8 is a simplified cross-sectional view of a plate assembly.

A second embodiment of the present invention is shown in FIGS. 7 and 8. FIG. 7 illustrates a fuel cell system 70 where a circuit board 72 extends below a conductive compressible connector 86. In an alternate embodiment, a flexible board trace may extend below the conductive compressible connector 86, thereby electrically coupling the circuit board 72 and the conductive compressible connector 86. The arrows pointing downward through the conductive compressible connector 86 illustrate the conduction path from the plate contactors. The arrow pointing down from a region 84 illustrates the conduction path for bipolar plate 74 if a conductive compressible connector below is present, which is discussed in more detail below. The arrow pointing up from the region 84 illustrates the conduction path from bipolar plate 74 through the circuit board 72 (or through a flexible board trace, if present). The circuit board 72 also includes communication devices 82, which may include, but are not limited to, a receiver and a transmitter.

A bipolar plate 74 is in direct electrical contact with the circuit board 72 at a region 84. Bipolar plates 76, 78 and 80 are in electrical communication with the conductive compressible connector 86 via plate contactors 88, 90 and 92. Each of the plate contactors 88, 90 and 92 are specifically shaped to sit at the top of and be in electrical communication with the conductive compressible connector 86. Although not shown, a fifth plate 94 similar to the plate 74 is stacked on top of the plate 80 to provide the fifth plate 94 necessary to monitor the four fuel cells, as previously discussed. The plate 74 does not require a plate contactor because the region 84 provides electrical communication on the top side and the bottom side. The bottom side of the region 84 is in electrical communication with the conductive compressible connector below it (if any), and the top side of the region 84 is in electrical communication with the circuit board 72 above it.

FIG. 8 is a simplified cross-sectional view of the fuel cell system 70 including the fifth bipolar plate 94 necessary to measure the electric signal of the four fuel cells, as previously discussed. As illustrated, the bottom of the bipolar plate 74 is in electrical contact with the circuit board 72 at the top side of the region 84. The bipolar plates 76, 78 and 80 are in electrical contact with the conductive compressible connector 86 at the plate contactors 88, 90 and 92, respectively. The fifth bipolar plate 94 is in electrical contact with the conductive compressible connector 86 at the bottom side of the region 84 for that particular bipolar plate 94. In this way, several fuel cells may be stacked together where the fuel cells are utilizing the same conductive compressible connector 86, the circuit board 72, and the communication devices 82. This allows each cell to be monitored, as well as cell-to-cell short-circuiting to be performed as desired, using fewer components. As discussed above, fewer components means less space is required to perform electric signal processing, and the costs associated therewith are reduced.

Figure 9:
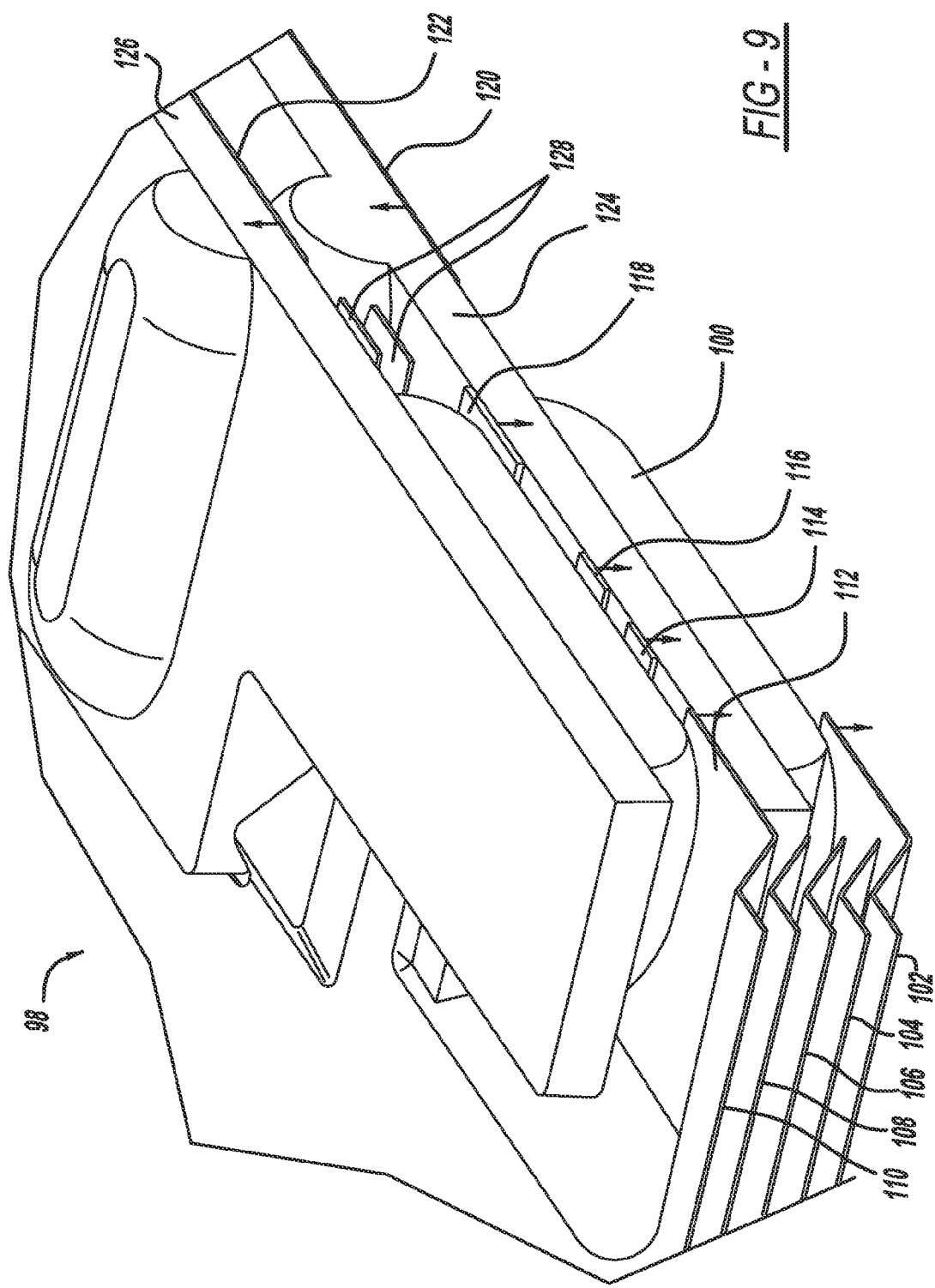
FIG. 9 is a diagram of bipolar plates directly in contact with circuit boards where a piece of non-conductive rubber is used to press the plate contactors against the circuit board.
Figure 10:
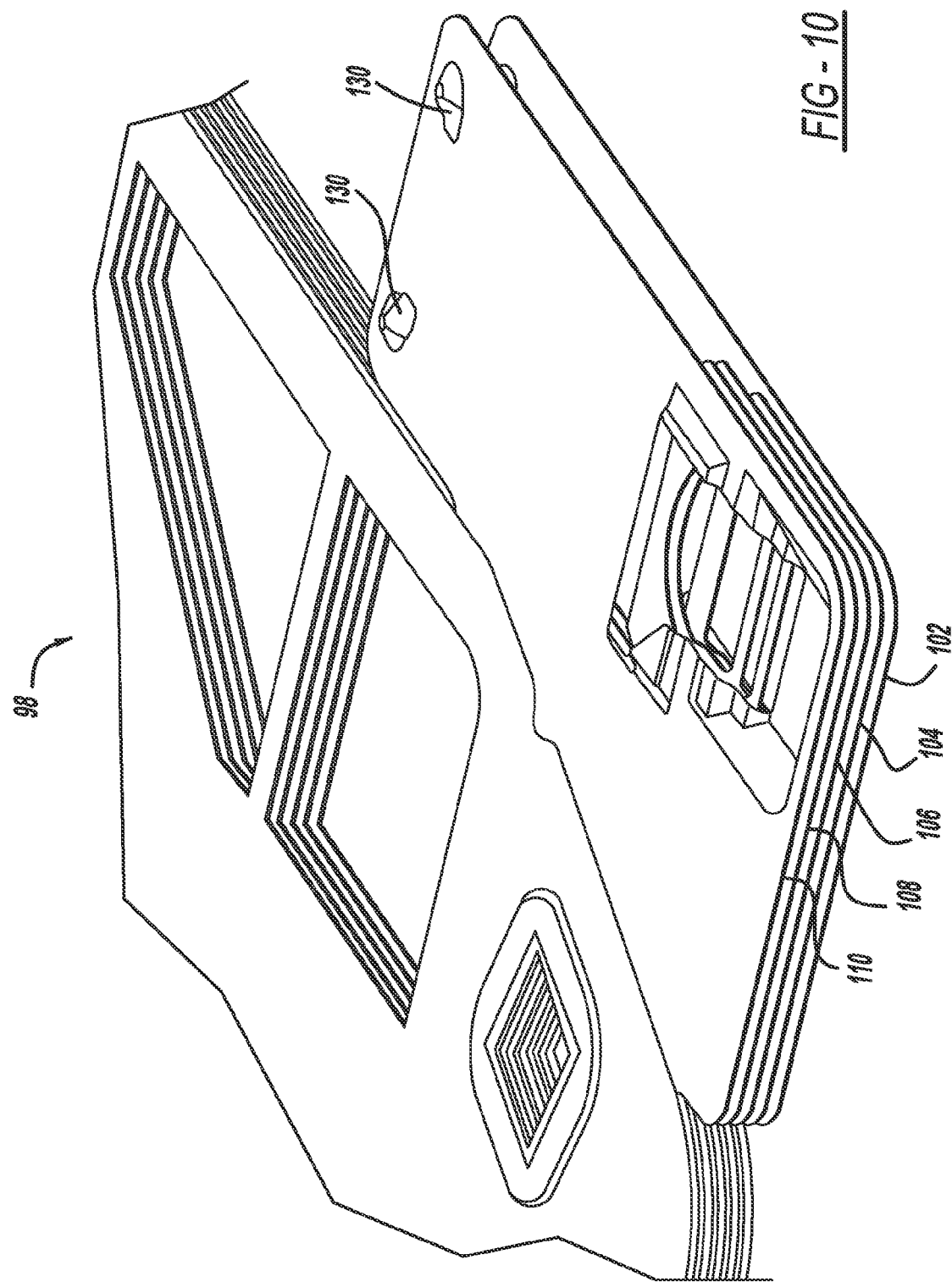
FIG. 10 is a diagram of bipolar plates with notched regions that receive two corners of a circuit board.

A third embodiment 98 of the present invention is shown in FIGS. 9 and 10. FIG. 9 illustrates a non-conductive elastomer 100, such as a piece of rubber, to press plate contactors 112, 114, 116 and 118 of bipolar plates 104, 106, 108 and 110 against a circuit board 124. The arrows pointing downward to the circuit board 124 illustrate the conduction path from the plate contactors 112, 114, 116 and 118 and other contact regions on the bipolar plates 104, 106, 108 and 110. Alternatively, the non-conductive elastomer 100 could press plate contactors 112, 114, 116 and 118 against a flexible circuit substrate in electrical communication with the circuit board 124, as is readily apparent to those skilled in the art. The pressure from the non-conductive elastomer ensures adequate electrical contact for the plate contactors 112, 114, 116 and 118 to the circuit board 124. A bipolar plate 102 is in electrical contact with the circuit board 124 at a plate contactor 120. The bipolar plate 110 is in electrical contact with the circuit board 124 by the plate contactor 112, and the bipolar plate 110 is also in electrical contact with a circuit board 126 at a plate contactor 122. Two bridges 128 are also shown in FIG. 9, however, they are not in electrical communication with any circuit board. The bridges 128 provide mechanical stability.

FIG. 10 illustrates the third embodiment 98 of the present invention including notched regions 130, which allow for the circuit board 124 or 126 to be properly inserted and aligned with relative ease, and ensures the boards 124 and 126 stay in place upon compression of the fuel cell stack.

Thus, in all of the above embodiments, a plurality of bipolar plates are connected to one circuit board, with the last bipolar plate in electrical contact with a circuit board above it and below it (if more than one circuit board is being used). Thus, a plurality of fuel cells share electric signal processing components, allowing electric signal processing and cell-to-cell short-circuiting of the fuel cell while reducing the costs and amount of space required.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An electric signal processing system for a fuel cell stack, said system comprising:
   at least two fuel cells;
   at least three bipolar plates, each of the at least three bipolar plates including a plate contactor that is part of the bipolar plate;
   at least one non-conductive elastomer positioned on top of the at least three bipolar plates directly above the plate contactor; and
   at least one circuit board in electrical communication with the plate contactors of the at least three bipolar plates, and seated on and in electrical communication with a bottom bipolar plate including a depression, where the plate contactors are shaped such that electrical contact is made at a specific location on the circuit board and where the non-conductive elastomer is seated within the depression, wherein the non-conductive elastomer presses a contactor region of a top bipolar plate of the at least three bipolar plates down on the circuit board, and the circuit board down on the bottom bipolar plate to minimize electrical contact resistances.

2. The system according to claim 1 wherein the plate contactors are stamped and shaped to make electrical contact with the circuit board at the specific location of the circuit board.

3. The system according to claim 1 further comprising a trace connector between and in electrical communication with the plate contactors and conduction points of the bipolar plates and the circuit board, wherein the trace connector enables the circuit board to process the electric signals from the at least three bipolar plates.

4. The system according to claim 1 further comprising an electronics package electrically coupled to the at least one circuit board, wherein the electronics package monitors cell function.

5. The system according to claim 1 wherein the electronics package includes a power conversion module, a power distribution module, and communication devices.

6. The system according to claim 1 wherein the non-conductive elastomer includes rubber.

7. The system according to claim 1 wherein at least one notched region on at least one of the bipolar plates near an edge of where the circuit board will sit to allow for proper alignment and ease of insertion of the circuit board.

8. An electric signal processing system for a fuel cell stack, said system comprising:
   a plurality of fuel cells;
   at least three bipolar plates, each of the at least three bipolar plates including a plate contactor that is part of the bipolar plate;
   at least one non-conductive elastomer positioned on top of the at least three bipolar plates directly above the plate contactor;
   at least one circuit board in electrical communication with the plate contactors of the at least three bipolar plates, and seated on and in electrical communication with a bottom bipolar plate including a depression, where the plate contactors are shaped such that electrical contact is made at a specific location on the circuit board and where the non-conductive elastomer is seated within the depression, wherein the non-conductive elastomer presses a contactor region of a top bipolar plate down on the circuit board, and the circuit board down on the bottom bipolar plate to minimize electrical contact resistances; and
   at least one notched region on at least one of the bipolar plates near an edge of where the circuit board will sit to allow for proper alignment and ease of insertion of the circuit board.

9. The system according to claim 8 wherein the plate contactors are stamped and shaped to make electrical contact with the circuit board at the specific location of the circuit board.

10. The system according to claim 8 further comprising a trace connector between and in electrical communication with the plate contactors and conduction points of the bipolar plates and the circuit board, wherein the trace connector enables the circuit board to process the electric signals from the at least three bipolar plates.

11. The system according to claim 8 further comprising an electronics package electrically coupled to the at least one circuit board, wherein the electronics package monitors cell function.

12. The system according to claim 8 wherein the electronics package includes a power conversion module, a power distribution module, and communication devices.

13. The system according to claim 8 wherein the non-conductive elastomer includes rubber.

* * * * *